(12) United States Patent
Arai et al.

(10) Patent No.: US 7,837,870 B2
(45) Date of Patent: Nov. 23, 2010

(54) ION-REMOVING APPARATUS

(75) Inventors: Yasunari Arai, Takahama (JP); Akishi Morita, Aichi-ken (JP); Nobuhiko Nakagaki, Nagoya (JP); Hiroyuki Sekine, Nagoya (JP)

(73) Assignees: Toyota Boshoku Kabushiki Kaisha, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 1196 days.

(21) Appl. No.: 11/453,559

(22) Filed: Jun. 15, 2006

(65) Prior Publication Data

US 2007/0000791 A1 Jan. 4, 2007

(30) Foreign Application Priority Data

Jun. 16, 2005 (JP) .............................. 2005-176289

(51) Int. Cl.
*B01D 15/04* (2006.01)
*B01D 35/01* (2006.01)

(52) U.S. Cl. ........................ 210/188; 210/265; 210/266; 210/282; 210/283; 210/284; 210/286; 210/289; 210/304; 210/317; 210/484; 96/219

(58) Field of Classification Search ................. 210/188, 210/265, 266, 282, 283, 284, 285, 286, 289, 210/290, 291, 304, 317, 484, 686; 96/219
See application file for complete search history.

(56) References Cited

U.S. PATENT DOCUMENTS 3,771,290 A * 11/1973 Stethem ........................ 96/210
6,132,612 A * 10/2000 Bourgeois .................... 210/282

FOREIGN PATENT DOCUMENTS

| JP | 52-67773 | 5/1977 |
|---|---|---|
| JP | 2-86694 | 7/1990 |
| JP | 03-154686 | 7/1991 |
| JP | 2002-313404 | 10/2002 |
| JP | 2004-141695 | 5/2004 |
| JP | 2005011803 A * | 1/2005 |

* cited by examiner

*Primary Examiner*—Matthew O Savage
(74) *Attorney, Agent, or Firm*—Patterson Thuente Christensen Pedersen, P.A.

(57) ABSTRACT

An ion-removing apparatus includes a housing, a first ion-removing unit and a second ion-removing unit. The housing includes an inlet port, a liquid discharge port and a gas discharge port. The first ion-removing unit is disposed within the housing, so that the fluid that has entered the housing via the inlet port flows through the first ion-removing unit. The first ion-removing unit serves to remove a first ion, such anions, contained in the fluid. The second ion-removing unit is disposed within the housing, so that the fluid that has flown though the first ion-removing unit flows through the first ion-removing unit. The second ion-removing unit serves to remove a second ion, such as cations contained in the fluid. The liquid contained in the fluid that has flown through the second ion-removing unit is discharged from the liquid discharge port. The gas contained in the fluid that has flown through the second ion-removing unit is discharged from the gas discharge port.

4 Claims, 4 Drawing Sheets

ION-REMOVING APPARATUS

This application claims priority to Japanese patent application serial number 2005-176289, the contents of which are incorporated herein by reference.

BACKGROUND OF THE INVENTION

1. Field of the Invention

The present invention relates to ion-removing apparatus for removing ions contained in a fluid.

2. Description of the Related Art

Figure 4:
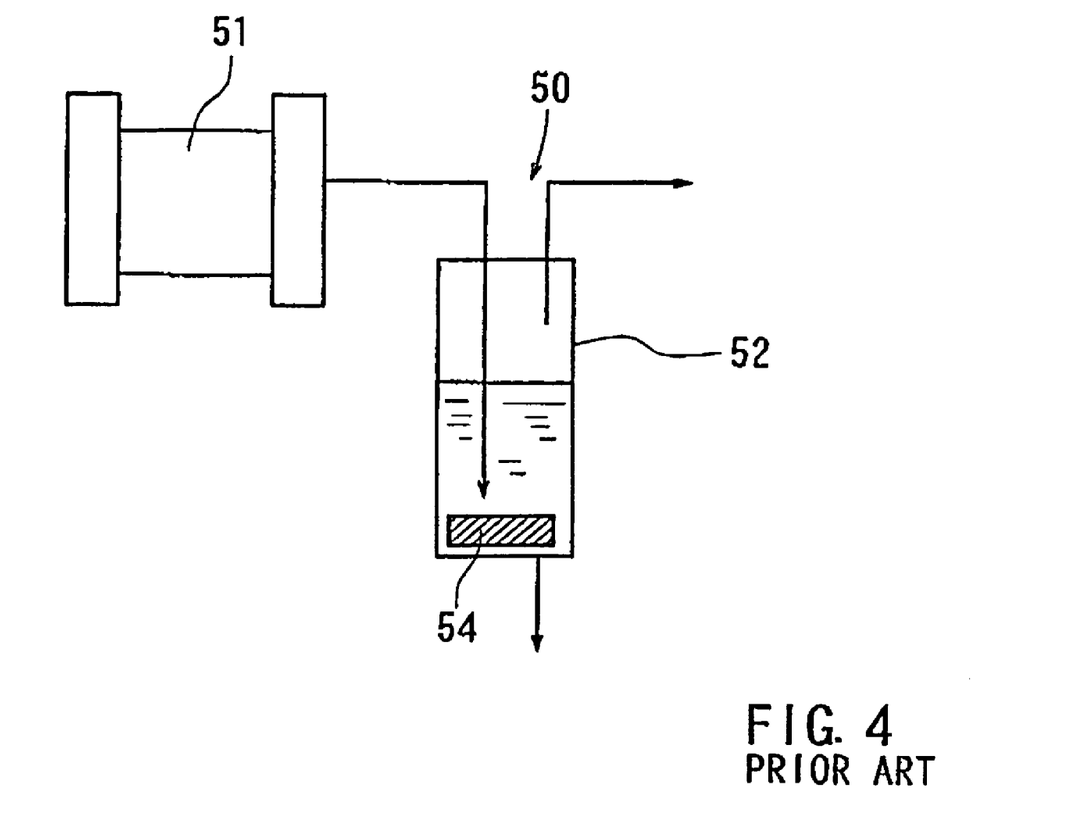
FIG. 4 is a schematic view of a known ion-removing apparatus.

Various types of ion-removing apparatus are known. For example, Japanese Laid-Open Patent Publication No. 2002-313404 teaches an ion-removing apparatus 50 shown in FIG. 4. The ion-removing apparatus 50 is designed for removing ions contained in a fluid that is discharged from a fuel cell 51. The ion-removing apparatus 50 includes a container 52 and an ion exchange resin 54. The container 52 stores water. The ion exchange resin 54 is disposed within the container 52 and is immersed into the water. The fluid that has been discharged from the fuel cell 51 may flow through the water within the container 52, so that the liquid contained in the discharged fluid may be left to be contained in the water, while the gas contained in the fluid may be discharged as bubbles from the container 52. The liquid remained in the water may contain ions. The ion exchange resin 54 may adsorb the ions, so that the ions may be removed from the fluid that has been discharged from the fuel cell 51.

However, it is difficult to efficiently remove a number of different kinds of ions, such as anions and cations, contained in the fluid by the use of the above ion-removing apparatus 50. For example, assuming that the ion exchange resin 54 includes an ion exchange resin for removing anions (hereinafter called "resin A") and an ion exchange resin for removing cations (hereinafter called "resin B") and that the resin A and resin B are disposed separately from each other, it is difficult to adsorb cations positioned proximally to the resin A (for anions) by the resin B (for cations). Similarly, it is difficult to adsorb anions positioned proximally to the resin B by the resin A. Therefore, the efficiency in general for removing anions and cations is degraded.

This may be improved by positioning the resins A and the resins B such that they are uniformly mixed with each other. However, if the resins A have become unusable while the resins B still can be used, it is necessary to change both the resins A and B to new ones.

SUMMARY OF THE INVENTION

It is accordingly an object of the present invention to provide techniques for efficiently removing plural kinds of ions contained in a fluid and for enabling ion exchange resins to be used for their usable life periods, thereby improving the economical aspect.

According to one aspect of the present teachings, ion-removing apparatus are taught that include a housing, a first ion-removing unit and a second ion-removing unit. The housing includes an inlet port for receiving a supply of a fluid, a liquid discharge port for discharging a liquid contained in the fluid, and a gas discharge port for discharging a gas contained in the fluid. The first ion-removing unit is disposed within the housing, so that only the fluid that has entered the housing via the inlet port is permitted to flow through the first ion-removing unit. The first ion-removing unit serves to remove a first ion, such anions, contained in the fluid. The second ion-removing unit is disposed within the housing, so that only the fluid that has flown though the first ion-removing unit is permitted to flow through the first ion-removing unit. The second ion-removing unit serves to remove a second ion, such as cations contained in the fluid. The liquid contained in the fluid that has flown through the second ion-removing unit is discharged from the liquid discharge port. The gas contained in the fluid that has flown through the second ion-removing unit is discharged from the gas discharge port.

With this arrangement, the first ion may be removed as the fluid flows through the first ion-removing unit. Then, the second ion may be removed as the fluid further flows through the second ion-removing unit. After leaving the second ion-removing unit, the liquid contained in the fluid is discharged via the liquid discharge port and the gas contained in the fluid is discharged via the gas discharge port. In this way, the fluid flows through the first and second ion-removing units that are arranged in series with each other. Therefore, the first and second ions can be effectively removed.

In addition, the first ion-removing unit has become to be no longer usable, while the second ion-removing unit is still usable, it is possible to replace only the first ion-removing unit. Therefore, both the first and second ion-removing units can be used until the ends of their usable lives, so that the economical aspect can be improved.

In one embodiment, each of the first and second ion-removing units has a container with inlet openings and outlet openings and also includes ion exchange resin granules contained in the container.

Each of the inlet openings and each of the outlet openings of the container respectively have a size substantially greater than the size of the ion exchange resin granules. The inlet openings and the outlet openings are respectively covered by net sheets having meshes smaller than the size of the ion exchange resin granules.

Because the inlet openings and outlet openings of the container are covered by the net sheets, the ion exchange resin granules can be reliably held within the container. In addition, the sizes of the inlet openings and the outlet openings can be freely determined independently of the size of the ion exchange resin granules. Further, because the net sheets may prevent any foreign particles from entering the container, the ion exchange resin granules may be protected from any interaction by the foreign particles. In addition, free spaces between the ion exchange granules can be ensured to prevent potential clogging by the foreign particles.

In another embodiment, the first ion-removing unit includes a first container. The first container has an annular configuration with a first central through-hole and has at least one inlet openings and at least one outlet openings. The second ion-removing unit includes a container body and a tubular member. The container body has an annular configuration with a second central through-hole and has at least one inlet openings and at least one outlet openings. The tubular member extends coaxially with the second central through-hole from one end of the container body. The tubular member is inserted into the first through-hole of the first container, so that the first container and the second container are assembled to each other with the first container and the second container arranged vertically on the same axis and with the at least one outlet opening of the first container communicating with the at least one inlet opening of the second container when the tubular member.

This arrangement facilitates the assembling and disassembling operations of the first and second ion-removing units. Therefore, each of the first and second ion-removing units can easily be replaced.

Preferably, each of the first and second containers defines a inner space that is segmented in the circumferential direction by a plurality of net sheets. Therefore, the movement of the exchange resin granules in the circumferential direction within the container may be limited by the net sheets. As a result, it is possible to prevent potential accumulation of the ion exchange resin granules to anywhere along the circumferential direction of the container.

DETAILED DESCRIPTION OF THE INVENTION

Each of the additional features and teachings disclosed above and below may be utilized separately or in conjunction with other features and teachings to provide improved ion-removing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
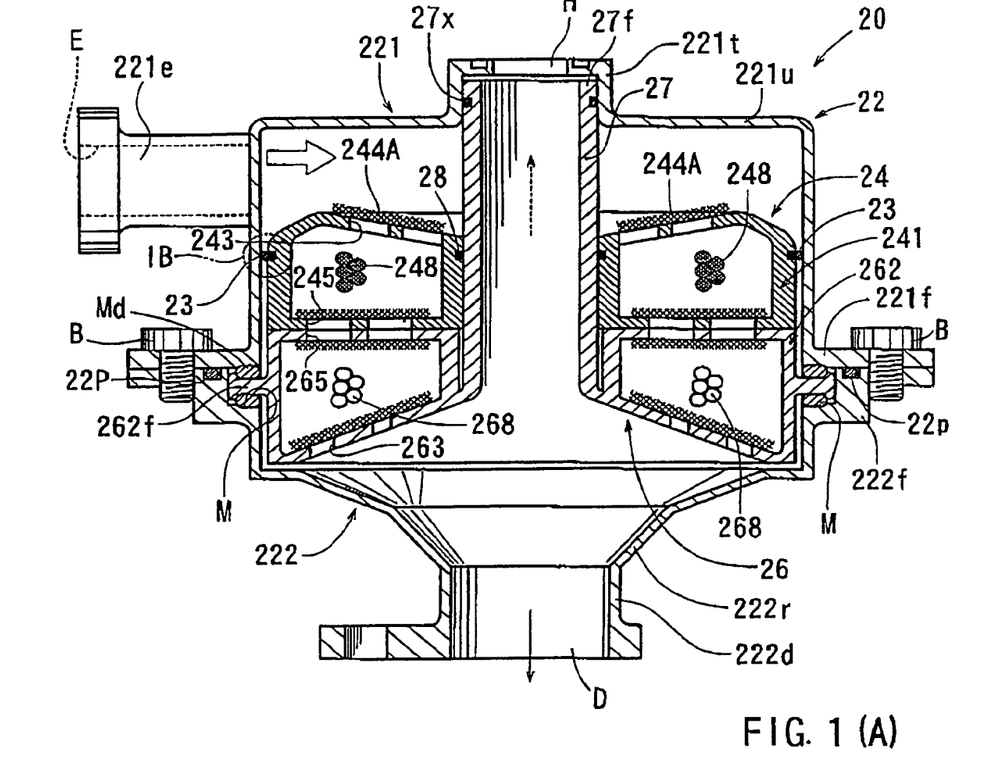
FIG. 1(A) is a vertical sectional view of an ion-removing apparatus according to a representative embodiment.
FIG. 1(B) is an enlarged view of a portion IB in FIG. 1(B)
Figure 2:
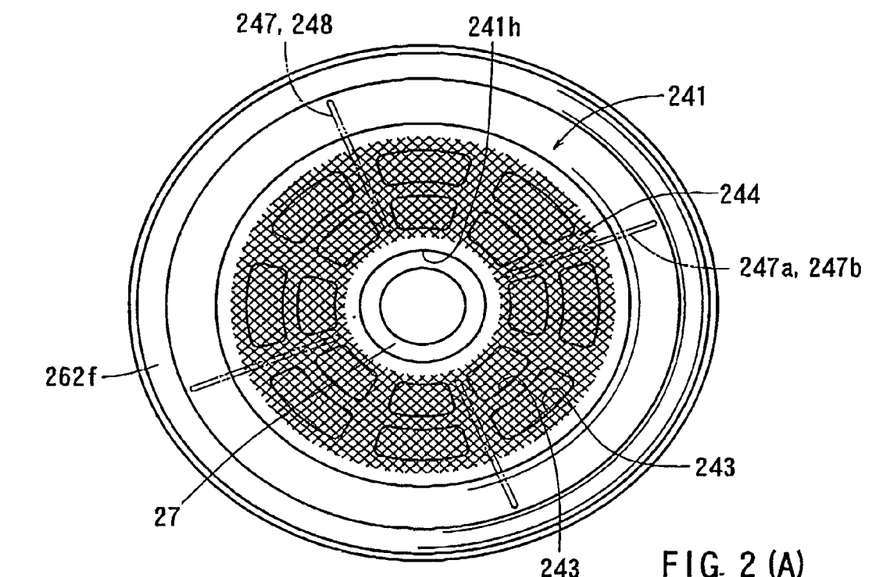
FIG. 2(A) is a plan view of an ion-removing unit assembly of the ion-removing apparatus.
FIG. 2(B) is a vertical sectional view of the ion-removing unit assembly.

A representative embodiment of the present invention will now be described with reference to FIGS. 1 to 3. The representative embodiment is embodied as an ion-removing apparatus that is used for removing ions contained in a fluid that is discharged from a fuel cell in a fuel cell system. General construction of the fuel cell system will be first described with reference to FIG. 3 before the explanation of the ion-removing apparatus of the representative embodiment.

Figure 3:
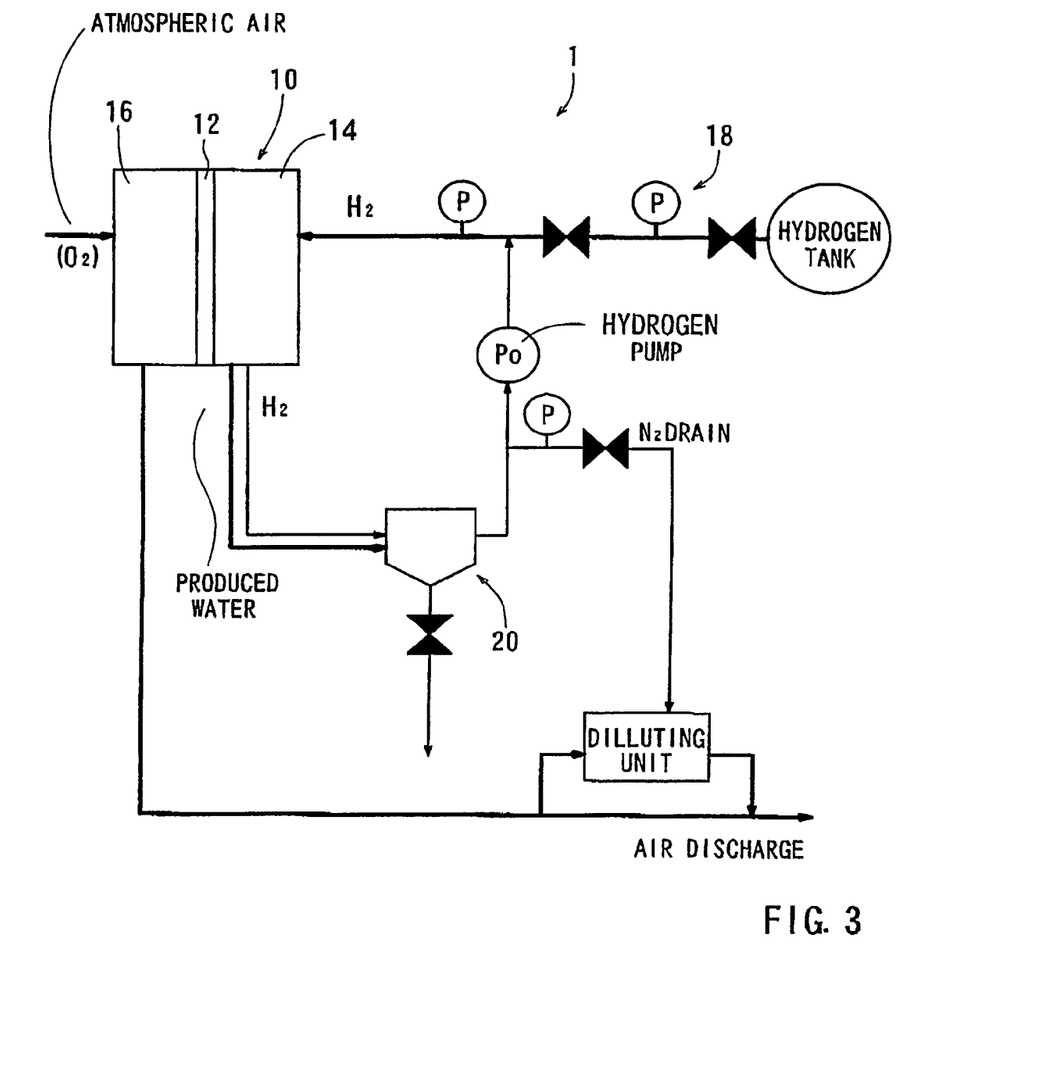
FIG. 3 is a schematic diagram of a fuel cell system incorporating the ion-removing apparatus.

Referring to FIG. 3, a fuel cell system 1 includes a fuel cell 10, a gas supply unit 18 for supplying a fuel gas to the fuel cell 10, and an air supply unit (not shown) for supplying air, preferably oxygen, to the gas supply unit 18. The fuel cell 10 may generate an electric power through a chemical reaction between hydrogen as the fuel gas and oxygen contained in the air. The fuel cell 10 has an anode 14, a cathode 16 and an electrolyte membrane 12 interleaved between the anode 14 and the cathode 16. The anode 14 may receive the supply of the hydrogen gas from the gas supply unit 18. The cathode 16 may receive the supply of the air (i.e., oxygen) from the air supply unit.

When the oxygen gas and the air (i.e., oxygen) are respectively supplied to the anode 14 and the cathode 16 of the fuel cell 10, a voltage may be produced between the anode 14 and the cathode 16 by the chemical reaction between the hydrogen and the oxygen. Water may be produced as a by-product of the chemical reaction.

The produced water together with a volume of the hydrogen that has not been consumed at the anode 14 may be introduced into an ion-removing apparatus 20 having a gas/liquid separating function. Plurality of ions contained in the produced water may then be removed by the ion-removing apparatus 20 as will be described later. After the ions have been removed, the produced water may be discharged from the ion-removing apparatus 20 and may then be introduced into a produced water tank (not shown). The gas (hydrogen) also may be discharged from the ion-removing apparatus 20 and may be supplied again to the anode 14 as a fuel gas. The air (oxygen) that has not been consumed at the cathode 16 may be discharged to the atmosphere.

Construction of Ion-Removing Apparatus

The ion-removing apparatus 20 is configured to remove predetermined cations and anions from the fluid discharged from the fuel cell 10, which may be a mixture of the produced water, oxygen, water vapor, mist, etc., as the fluid is separated into the hydrogen and the produced water.

As shown in FIG. 1(A), the ion-removing apparatus 20 includes a first ion-removing unit 24 for removing anions, a second ion-removing unit 26 for removing cations, and a housing 22 for accommodating the first and second ion-removing units 24 and 26 therein and for performing gas/liquid separation.

The housing 22 includes an upper housing 221 and a lower housing 222. The upper housing 221 has a cylindrical tubular configuration with a top wall and a lower opening. Similarly, the lower housing 222 has a cylindrical tubular configuration with a bottom wall and a top opening. A joint flange 221f is formed on a peripheral portion of a lower opening of the upper housing 221. Similarly, a joint flange 222f is formed on a peripheral portion of the upper opening of the lower housing 221. The joint flanges 221f and 222f are joined to each other with a gasket 22p interleaved therebetween, so that the inner space of the housing 22 may be sealed from the environment.

A short pipe 221e is joined to the side surface of the upper portion of the upper housing 221 and extends tangentially from the side surface. An inlet port E is formed in one end of the short pipe 221e and communicates with the inner space of the housing 22. Since the short pipe 221e is connected tangentially to the upper housing 221, the fluid entering the inlet port E of the short pipe 221e into the inner space of the housing 22 may circulate along the circumferential wall of the housing 22.

A short-pipe like projection 221t is formed centrally of a top wall 221u of the upper housing 221. The projection 221t extends upward from the top wall 221u and coaxially with the upper housing 221. A gas discharge port H is formed in one end (upper end) of the projection 221t and communicates with the inner space of the housing 22.

A bottom wall 222r of the lower housing 222 has a funnel-like configuration or a substantially inverted truncated conical configuration and has a straight short-pipe like portion 222d defining a liquid discharge port D at its lower end.

Preferably, the housing 22 may be made of material with high strength and excellent corrosion resistance, such as stainless steel or the like.

The first ion-removing unit 24 serves to remove anions contained in the fluid discharged from the fuel cell 10. As shown in FIGS. 2(A) and 2(B), the first ion-removing unit 24 includes a first container 241 and ion exchange resin granules 248 contained within the first container 241.

The first container 241 generally has an annular configuration and has a central through-hole 241h. More specifically, the first container 241 has a tubular inner circumferential wall 241e defining the through-hole 241h, a tubular outer circumferential wall 241r, an annular top wall 241u and an annular bottom wall 241b, so that an annular inner space having a substantially polygonal cross section is defined within the first container 241. The outer diameter of the outer circumferential wall 241r is determined to be substantially equal to the inner diameter of the upper housing 221.

As shown in FIG 2(B), the top wall 241u of the first container 241 is configured to have a substantially inverted truncated conical configuration such that the level is the lowest at a portion about the central through-hole 241h. Radially displaced two groups of inlet openings 243 are formed in the top wall 241u, so that the discharged fluid may flow into the first container 241 via the inlet openings 243. The inlet openings 243 in each group are equidistantly spaced from each other in the circumferential direction. For example, the inlet openings 243 may be displaced from each other by an angle of 45° in the circumferential direction. A mesh filter 244A is attached to the top wall 241u in order to cover the inlet openings 243 from the outer side. In this representative embodiment, the open ratio or the ratio of areas of the inlet openings 243 to the area of the top wall 241u is preferably set to be between 10% and 50%. The mesh filter 244A may be formed by resin fibers that have an average diameter of about 25 μm and woven into a grid-like or net-like structure with an average mesh size of about 40 μm.

The bottom wall 241b of the first container 241 extends perpendicular to the inner circumferential wall 241e and the outer circumferential wall 241r. Radially displaced two groups of outlet openings 245 are formed in the bottom wall 241b for the flow of the fluid out of the first container 241. Similar to the inlet openings 243, the outlet openings 245 in each group are equidistantly spaced from each other in the circumferential direction. For example, the outlet openings 245 may be displaced from each other by an angle of 45°. A mesh filter 244B similar to the mesh filter 244A is attached to the bottom wall 241u from the inside of the first container 241 in order to cover the outlet openings 245. Also, the open ratio or the ratio of the areas of the outlet openings 245 to the area of the bottom wall 241b is preferably set to be between 10% and 50%.

As shown in FIG. 1(B), an annular recess 23m is formed in the outer circumferential surface of the upper portion of the outer circumferential wall 241r of the first container 241 and receives an O-ring 23 therein in order to provide a seal between the inner circumferential surface of the upper housing 221 and the first container 241. Therefore, the discharge fluid that has flown into the housing 22 will not leak and drop from a potential clearance between the first container 241 and the inner circumferential surface of the housing 22.

In addition, as shown in FIG. 2(B), an annular recess 28m is formed in the inner circumferential surface of the upper portion of the through-hole 241h of the first container 241 and receives an O-ring 28 in order to provide a seal between a tubular member 27 (that will be described later) and the first container 241. Therefore, the discharge fluid that has flown into the housing 22 will not leak and drop from a potential clearance between the inner circumferential surface of the through-hole 241h and the tubular member 27.

Further, as indicated by two-dotted chain lines in FIG. 2(A), the inner space of the first container 241 is divided into a plurality of sections, e.g., four sections, along the circumferential direction by segmenting mesh filters 247a and 247b. Preferably, the mesh of the segmenting mesh filters 247a and 247b is finer than the mesh filters 244A and 244B.

Preferably, the mesh filters 244A and 244B and the segmenting mesh filters 247a and 247b are formed by resin fibers each having a two layer structure including a polyethylene resin core layer and a polyethylene naphthalene resin cover layer about the core layer. The mesh filters 244A and 244B and the segmenting mesh filters 247a and 247b may be also called "net sheets" in this specification. Preferably, the first container 241 may be made of polypropylene resin.

The ion exchange resin granules 248 contained in the first container 241 may be made of anion exchange resin that adsorbs anions. An average diameter of the granules 248 may be between 0.1 mm and 0.5 mm. In order to position the anion exchange resin granules 248 in the first container 241, the first container 241 may have an open top. In other words, the anion exchange resin granules 248 may be positioned in the first container before attaching the top wall 241u to the first container 241. After positioning the granules 248, the top wall 241u may be attached to the first container 241 by means of welding or the like in order to close the open top.

As described previously, the inlet openings 243 and the outlet openings 245 of the first container 241 are respectively covered by the mesh filters 244A and 244B having an average mesh size of about 40 μm. Therefore, the anion exchange resin granules 248 and their fragments are prevented from moving to the outside of the first container 241 via the inlet and outlet openings 243 and 245. In addition, the inner space within the first container 241 is divided into a plurality of sections by the segmenting mesh filters 247a and 247b. Therefore, even in the event of vibrations occurring, the movement of the anion exchange resin granules 248 in the circumferential direction may be limited by the segmenting mesh filters 247a and 247b. Therefore, it is possible to prevent potential accumulation of the granules 248 to anywhere along the circumferential direction within the first container 241.

Second Ion-Removing Unit

The second ion-removing unit 26 removes cations contained in the fluid discharged from the fuel cell 10. As shown in FIGS. 2(A) and 2(B), the second ion-removing unit 26 includes a second container 262, the tubular member 27 and ion exchange resin granules 268 contained within the second container 262. In this representative embodiment, the tubular member 27 is formed integrally with the second container 262 as will be explained later. Therefore, in this description, the term "second container 262" is used to include the tubular member 27 in addition to the body of the second container 262.

The second container 262 generally has an annular configuration and has a central through-hole 262h. The tubular member 27 is inserted into the through-hole 262h and may serve to introduce the gas (hydrogen) contained in the fluid that has flown through the second container 262, into the gas discharge port H of the housing 22. The tubular member 27 has a base end (i.e., a lower end) 27m that is fixedly joined to the inner circumferential edge of a bottom wall 262b of the second container 262. The middle portion of the tubular member 27 extends upward from the through-hole 262h of the second container 262 and further extends upward through the through-hole 241h of the first container 241. An upper end 27f of the tubular member 27 is fitted into the projection 221t of the upper housing 221 (see FIG. 1). An O-ring 27x is interleaved between the upper end 27f of the tubular member 27 and the inner surface of the projection 221t.

As shown in FIG. 2(B), the second container 262 has a tubular inner circumferential wall 262e defining the through-hole 262h, a tubular Outer circumferential wall 262r, an annular top wall 262u and an annular bottom wall 262b, so that an annular inner space having a substantially polygonal cross section is defined within the second container 262. The outer diameter of the outer circumferential wall 262r is determined to be substantially equal to the inner diameter of the upper housing 221.

A flange 262f is formed on the outer circumferential wall 262r of the second container 262 at substantially the middle position with respect the height of the second container 262. The flange 262f is used for attaching the second container 262 and the first container 241 to the housing 22. With resilient members Md (see FIG. 1(A)) attached to upper and lower sides of the flange 262f, the flange 262f is inserted into an annular recess M formed in the joint flange 222f of the lower housing 222. Thereafter, the joint flange 221f of the upper housing 221 and the joint flange 222f of the lower housing 222 are joined to each other, so that the resilient members Md may be clamped together with the flange 262f between the joint flanges 221f and 222f.

As shown in FIG. 2(B), the top wall 262u of the second container 262 extends perpendicular to the inner circumferential wall 262e and the outer circumferential wall 262r, so that the top wall 262 may contact with the bottom wall 241b of the first container 241 in surface-to-surface contact relation therewith. Radially displaced two groups of inlet openings 265 are formed in the top wall 262u of the second container 262 and are positioned to respectively correspond to the outlet openings 245 formed in the bottom wall 241b of the first container 241. Therefore, the fluid that has flown out of the outlet openings 245 of the first container 241 may directly flow into the second container 262. Also, a mesh filter 244C similar to the mesh filters 244A and 244B is attached to the top wall 262u from the inside of the second container 262 in order to cover the inlet openings 265 of the second container 262. The open ratio or the ratio of the areas of the inlet openings 265 to the area of the top wall 262u is preferably set to be between 10% and 50%.

As shown in FIG. 2(B), the bottom wall 262b of the second container 262 has a substantially truncated conical configuration such that the level is the highest at a portion about the central through-hole 262h and the base end 27m of the tubular member 27. Radially displaced two groups of outlet openings 263 are formed in the bottom wall 262b. The outlet openings 263 in each group are equidistantly spaced from each other in the circumferential direction. For example, the outlet openings 263 may be displaced from each other by an angle of 45°. A mesh filter 244D similar to the mesh filters 244A, 244B and 244C is attached to the bottom wall 262b in order to cover the outlet openings 263 from the inside of the second container 262.

Also, the open ratio or the ratio of the areas of the outlet openings 263 to the area of the bottom wall 262b is preferably set to be between 10% and 50%. Preferably, the outlet openings 263 of the bottom wall 262b may be positioned as far as possible fxom the base end 27m of the tubular member 27.

Similar to the first container 241, polypropylene may be preferably used as the material of the second container 262 and the tubular member 27.

The ion exchange resin granules 268 contained in the second container 262 may be made of cation exchange resin that may adsorb cations. An average diameter of the granules 268 may be between 0.1 mm and 0.5 mm. The cation exchange resin granules 268 may be positioned in the second container 262 that has an open top. In other words, the granules 268 may be positioned in the second container 262 before attaching the top wall 262u to the second container 262. After positioning the granules 268, the top wall 262u may be attached to the second container 262 by means of welding or the like in order to close the open top. Also, the inner space may be divided into a plurality of sections in the circumferential direction by mesh filters 248 that are similar to the mesh filters 247a and 247b of the first container 241 (see FIG. 2(A)).

Assembling Process of Ion-Removing Apparatus

The first ion-removing unit 24 and the second ion-removing unit 26 may be assembled together into the ion-removing apparatus 20 according to the following process.

First, the tubular member 27 of the second container 262 of the second ion-removing unit 26 is inserted into the through-hole 241h formed in the first container 241 of the first ion-removing unit 24. Preferably, in order to position the first container 241 and the second container 241 relative to each other in the circumferential direction, a protrusion and a recess for engaging the protrusion may be provided on one of more of the inner wall of the through-hole 241h of the first container 241 and the tubular member 27 of the second container 262. Therefore, circumferential misalignment between the first container 241 and the second container 241 may not be caused during the step of inserting the tubular member 27 of the second container 262 into the through-hole 241h of the first container 241. In addition, the O-ring 28 may provide a seal between the tubular member 27 and the inner wall of the through-hole 241h.

When the tubular member 27 of the first container 241 has been completely inserted into the through-hole 241h of the second container 262, the outlet openings 245 of the first container 241 and the inlet openings 265 of the second container 262 may directly communicate with each other as shown in FIG. 2(B). The assembling process of the first ion-removing unit 24 and the second ion-removing unit 26 may be then completed. The first ion-removing unit 24 and the second ion-removing unit 26 may be disassembled from each other by simply removing the tubular member 27 from the through-hole 241h.

Next, the first and second ion-removing units 24 and 26 may be set into the lower housing 222. Thus, with the resilient members Md attached to the flange 262f of the second ion-removing unit 26, the flange 262 may be inserted into the annular recess M of the joining flange 222f of the lower housing 222.

Thereafter, the upper housing 221 is fitted to the first and second ion-removing units 24 and 26 such that the upper end 27f of the tubular member 27 of the second ion-removing unit 26 is received within the tubular projection 221t of the upper housing 221. Subsequently, the joint flange 221f of the upper housing 221 and the joint flange 222f of the lower housing 222 are joined to each other by a suitable connecting device, such as bolts B (see FIG. 1). During the joining process, the flange 262f of the second ion-removing unit 26 is clamped between the joint flanges 221f and 222f via the resilient members Md. Therefore, the assembly of the first and second ion-removing units 24 and 25 may be fixed in position relative to the housing 22. The assembling process of the ion-removing apparatus 20 is thus completed.

The first and second ion-removing units 24 and 25 may be removed from the housing 22 by releasing the connection between the upper housing 221 and the lower housing 222. In this way, the first and second ion-removing units 24 and 26 may be assembled together and may be disassembled from each other. In addition, the first and second ion-removing units 24 and 25 may be assembled to and disassembled from the housing 22.

The operation of the representative ion-removing apparatus 20 will now be described. First, the discharge fluid from the fuel cell 10, i.e., the mixture of the produced water, hydrogen, water vapor, mist, etc. (hereinafter also called simply as "fluid"), may enter the housing 22 via the inlet port E. The fluid may then circulate along the circumferential wall of the upper housing 221 as indicated by an outline arrow in FIG. 1 until the fluid reaches the inlet openings 243 of the first ion-removing unit 24 due to gravity force. The fluid may not flow directly into the liquid discharge port D along the outer circumferential surface of the upper housing 221, because the O-ring 23 provides a seal between the first container 241 of the first ion-removing unit 24 and the outer circumferential surface of the upper housing 221.

Because the inlet openings 243 of the first ion-removing unit 24 are covered by the mesh filter 244A, any foreign particles may be prevented from entering the first container 241. Therefore, damage of the anion exchange resin granules 248 by foreign particles may be prevented. In addition, because foreign particles may be prevented from entering the free spaces between anion exchange resin granules 248, potential clogging that may be caused by the foreign particles can be reduced. Here, the mesh filter 244A can be easily exchanged to new one, because the mesh filter 244A covers the inlet openings 243 from the outer side of the first container 241.

After the fluid has entered the first container 241 of the first ion-removing unit 24, anions contained in the fluid may be adsorbed by the anion ion exchange resin granules 248 as the fluid flows through the free spaces between the anion exchange resin granules 248. In other words, anions contained in the fluid may be removed as the fluid flows through the anion exchange resin granules 248. In addition, any mist that may be contained in the fluid may be coagulated and liquefied upon impinging on the anion ion exchange resin granules 248. The removal of the anions can be made under these circumstances.

After flowing through the anion exchange resin granules 248, the fluid may go from the first container 241 via the outlet openings 245 and may then directly flow into the second container 262 via the inlet openings 265 of the second ion-removing unit 26. Because the outlet openings 245 of the first container 241 and the inlet openings 265 of the second container 262 are, respectively, covered by the mesh filters 244B and 244C, any potential fragments of the anion exchange resin granules 248 or other foreign particles may be prevented from flowing into the second container 262.

After the fluid has entered the second container 262 of the second ion-removing unit 26, cations contained in the fluid may be adsorbed by the cation exchange resin granules 268 as the fluid flows through the fee spaces between the cation exchange resin granules 268.

After flowing through the cation exchange resin granules 268, the fluid may outgo the second container 262 via the outlet openings 263. The liquid content (including produced water) of the fluid may drop into the bottom portion 222r of the lower housing 227 by the gravity force and may then be discharged from the housing 22 via the liquid discharge port D. On the other hand, the gaseous content (including hydrogen) may flow upward into the tubular member 27 after outgoing from the outlet openings 263 of the second container 262. The gaseous content may then be discharged from the gas discharge port H. Because the outlet openings 263 are covered by the mesh filter 244D, potential fragments of the cation exchange resin granules 268 or any other foreign particles may not be discharged to the environment.

After leaving the gas discharge port H of the housing 22, the gaseous content (including hydrogen) may be supplied again to the anode 14 of the fuel cell 10 by the action of a hydrogen pump P0 shown in FIG. 3. Because the ions have been removed from the gaseous content (hydrogen) before the gaseous content is supplied to the fuel cell 10, potential degradation of the fuel cell 10 by the ions can be inhibited or minimized.

According to the representative ion-removing apparatus 20, the anions contained in the fluid may be removed as the fluid flows through the first ion-removing unit 24. Thereafter, the cations contained in the fluid may be moved as the fluid further flows through the second ion-removing unit 26. After flowing through the second ion-removing unit 26, the liquid content contained in the fluid may be discharged from the liquid discharge port D, while the gaseous content contained in the fluid may be discharged from the gas discharge port H. Because the fluid flows through the first and second ion-removing units 24 and 26 that are arranged in series with each other, the anions and cations may be effectively removed.

The first and second ion-removing units 24 and 26 can be assembled to and disassembled from each other, and the assembly of the first and second ion-removing units 24 and 26 also can be assembled to and disassembled from the housing 22. Therefore, for example, in the case that the first ion-removing unit 24 is no longer usable but the second ion-removing unit 26 is still usable, it is possible to replace only the first ion-removing unit 24. As a result, it is possible to use both the first and second ion-removing units 24 and 26 until the ends of their usable lives, and therefore provides a more economical device.

The inlet openings 243 and the outlet openings 245 of the first containers 241 are respectively covered by the mesh filters 244A and 244B. Also, the inlet openings 265 and the outlet openings 263 of the second container 262 are respectively covered by the mesh filters 244C and 244D Therefore, the anion exchange resin granules 248 can be reliably held within the first container 241 by the mesh filters 244A and 244B, and the cation exchange resin granules 268 can be reliably held within the second container 262 by the mesh filters 244C and 244D. In addition, the sizes of the inlet openings 243 and 265 and the outlet openings 248 and 268 can be freely determined independently of the sizes of the anion and cation exchange resin granules 248 and 268. Further, because any foreign particles contained in the fluid may be prevented from entering the first container 241 and the second container 262, the anion and cation exchange resin granules 248 and 268 may be protected against potential damage by the foreign particles. The free spaces between the anion exchange resin granules 248 and those between the cation exchange resin granules 262 may be reliably ensured to be prevented from potential clogging by the foreign particles.

Because the first and second ion-removing units 24 and 26 can be easily assembled and disassembled, the first and second ion-removing units 24 and 26 can be easily replaced.

The inner spaces of the first and second containers 241 and 262 are respectively divided into plurality of individual sections in the circumferential direction by the segmenting mesh filters 247a and 247b. Therefore, the movement of the anion exchange resin granules 248 in the circumferential direction within the first container 241 may be limited by the segmenting mesh filters 247a and 247b. Similarly, the movement of the cation exchange resin granules 268 in the circumferential direction within the second container 262 may be limited by the segmenting mesh filters 248. Therefore, it is possible to prevent potential accumulation of the anion exchange resin granules 248 and the cation exchange resin granules 268 to anywhere along the circumferential direction respectively within the first and second containers 241 and 262.

The ions contained in the fluid can be removed as the fluid is separated into the liquid content and the gaseous content. Therefore, it is not necessary to provide a gas/liquid separation device and an ion-removing apparatus that are separated from each other. As a result, the size of the apparatus may be minimized. Further, it is possible to remove ions contained in a mist or the like in the fluid.

While the invention has been described with reference to specific embodiments, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the embodiments described above, but may be modified as described below.

In the above representative embodiment, the anions are removed by the first ion-removing unit 24, and the cations are removed by the second ion-removing unit 26. However, it is possible to exchange the ion removing resin granules 248 and 268, so that the cations may be removed by the first ion-removing unit 24 and the anions may be removed by the second ion-removing unit 26.

In the above representative embodiment, the first and second ion-removing units 24 and 26 are arranged vertically and the fluid flows downward from above. However, the first and second ion-removing units 24 and 26 may be arranged in the circumferential direction if the fluid is introduced to circulate as in the above representative embodiment. Also, a plurality of first ion-removing units 24 and a plurality of second ion-removing units 26 alternately in the circumferential direction.

In the above representative embodiment, the second container 262 of the second ion-removing unit 26 is joined to the tubular member 27 at the bottom of the second container 262. However, the second container 262 may be joined to the tubular member 27 at the top of the second container 262.

In the above representative embodiment, the anion and cation exchange resin granules 248 and 268 are respectively positioned in the ion-removing units 24 and 26. However, the anion exchange resin granules 248 or the cation exchange resin granules 268 may be replaced with ion neutralizer, such as $CaCO_3$.

The first and second ion-removing units 24 and 26 may be used for removing different types of anions or may be use for removing different types of cations.

In the above representative embodiment, the ion-removing apparatus 20 is designed for receiving a fluid that is discharged from the side of the anode 14 of the fuel cell 10. However, it is possible that the ion-removing apparatus 20 receives a fluid that is discharged from the side of the cathode 16.

This invention claims:

1. An ion-removing apparatus comprising:
    a housing including:
        an inlet port arranged and constructed to receive a supply of a fluid;
        a liquid discharge port arranged and constructed to discharge a liquid contained in the fluid; and
        a gas discharge port arranged and constructed to discharge a gas content contained in the fluid;
    a first ion-removing unit disposed within the housing, so that the fluid that has entered the housing via the inlet port is permitted to flow through the first ion-removing unit,
    wherein the first ion-removing unit is arranged and constructed to remove a first ion contained in the fluid;
    a second ion-removing unit disposed within the housing, so that the fluid that has flown though the first ion-removing unit is permitted to flow through the second ion-removing unit, wherein the second ion-removing unit is arranged and constructed to remove a second ion contained in the fluid;
    wherein a liquid contained in the fluid that has flown through the second ion-removing unit is discharged from the liquid discharge port;
    wherein a gas contained in the fluid that has flown through the second ion-removing unit is discharged from the gas discharge port;
    wherein the first ion-removing unit comprises a first container having an annular configuration with a first central through-hole and having at least one inlet opening and at least one outlet opening; and
    the second ion-removing unit comprises:
        a second container having an annular configuration with a second central through-hole and having at least one inlet opening and at least one outlet opening; and
        a tubular member extending coaxially with the second central through-hole from one end of the second container;
        wherein the tubular member is inserted into the first through-hole of the first container, so that the first container and the second container are assembled to each other with the first container and the second container arranged vertically on the same axis and with the at least one outlet opening of the first container communicating with the at least one inlet opening of the second container when the tubular member has been inserted into the first through-hole of the first container.

2. The ion-removing apparatus as in claim 1, wherein the first ion-removing unit comprises ion exchange resin granules contained in the first container and the second ion-removing unit comprises ion exchange resin granules contained in the second container.

3. The ion-removing apparatus as in claim 2, wherein:
    each of the inlet and outlet openings of the first container and the second container respectively have a size substantially greater than the size of the ion exchange resin granules; and
    the inlet openings and the outlet openings are respectively covered by net sheets having a plurality of openings each having a size substantially smaller than the size of the ion exchange resin granules.

4. The ion-removing apparatus as in claim 1, wherein:
    each of the first and second containers define a inner space that is segmented in the circumferential direction by a plurality of net sheets.

* * * * *